(12) United States Patent
Facius et al.

(10) Patent No.: US 7,802,774 B2
(45) Date of Patent: Sep. 28, 2010

(54) COOLING TOWER AIR INLET AND DRAIN PAN

(75) Inventors: Timothy P. Facius, Ellicott City, MD (US); André Helsen, Keerbergen (BE)

(73) Assignee: Baltimore Aircoil Company, Inc., Jessup, MD (US)

( * ) Notice: Subject to any disclaimer, the term of this patent is extended or adjusted under 35 U.S.C. 154(b) by 891 days.

(21) Appl. No.: 11/595,595

(22) Filed: Feb. 20, 2007

(65) Prior Publication Data
US 2008/0197515 A1    Aug. 21, 2008

(51) Int. Cl.
*B01F 3/04* (2006.01)
(52) U.S. Cl. ............. 261/72.1; 261/119.1; 261/DIG. 11
(58) Field of Classification Search ............. 261/29, 261/72.1, 109, 112.1, 119.1, DIG. 11
See application file for complete search history.

(56) References Cited

U.S. PATENT DOCUMENTS

| | | | |
|---|---|---|---|
| 3,395,903 A * | 8/1968 | Norback et al. .......... 261/112.2 |
| 3,437,319 A * | 4/1969 | Engalitcheff, Jr. et al. ..... 261/29 |
| 3,792,841 A * | 2/1974 | Munters ................ 261/112.2 |
| 3,878,273 A * | 4/1975 | Anderson ................ 261/151 |
| 4,774,033 A * | 9/1988 | Raybon .................. 261/109 |
| 5,505,883 A * | 4/1996 | Kato ..................... 261/153 |
| 6,070,860 A * | 6/2000 | Kinney, Jr. et al. ......... 261/30 |
| 6,237,900 B1 * | 5/2001 | Drew et al. .............. 261/111 |
| 6,497,401 B2 * | 12/2002 | Flaherty ................. 261/109 |
| 6,598,862 B2 * | 7/2003 | Merrill et al. ............ 261/128 |
| 6,938,885 B2 * | 9/2005 | Koo .................... 261/112.2 |

* cited by examiner

*Primary Examiner*—Scott Bushey
(74) *Attorney, Agent, or Firm*—Edward J. Brosius

(57) ABSTRACT

A mechanical draft cooling tower is provided. The cooling tower includes a direct cooling section having a plurality of fill sheets. Water is sprayed downwardly over the fill sheets and is collected in a collection sump. The collection sump includes two end walls, two side walls, a floor and a drain. The end walls are sloped at the floor intersection. The floor is sloped to a center section where the drain is located.

10 Claims, 3 Drawing Sheets

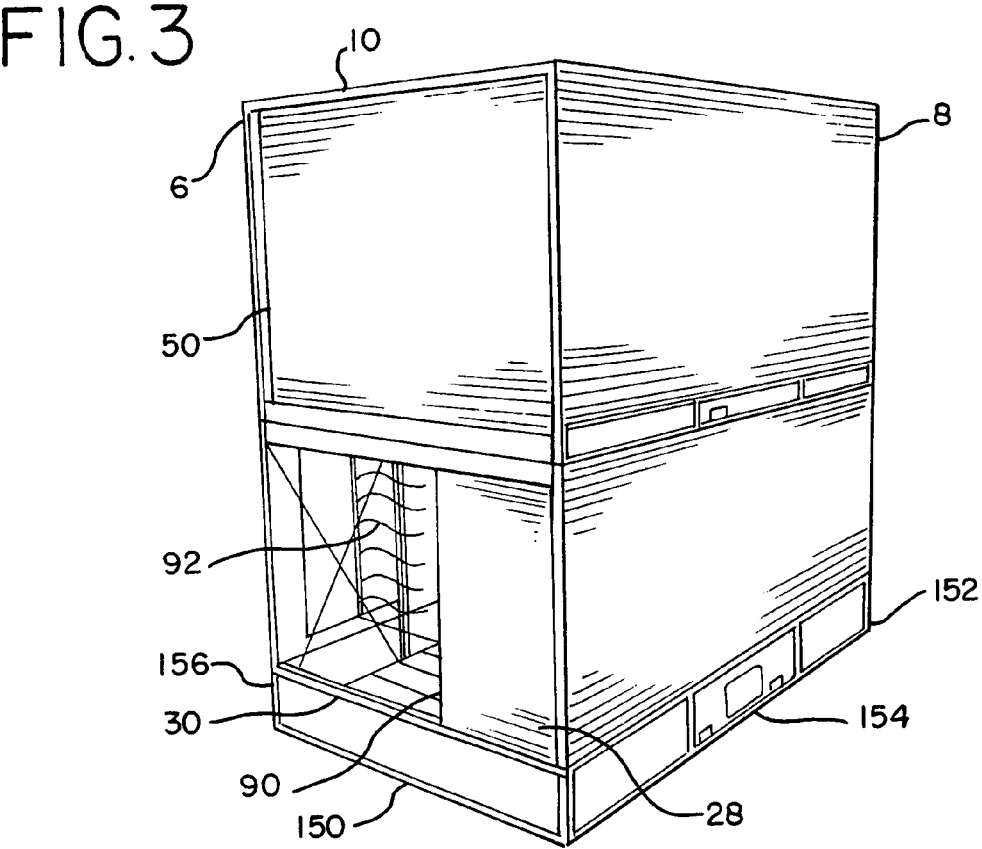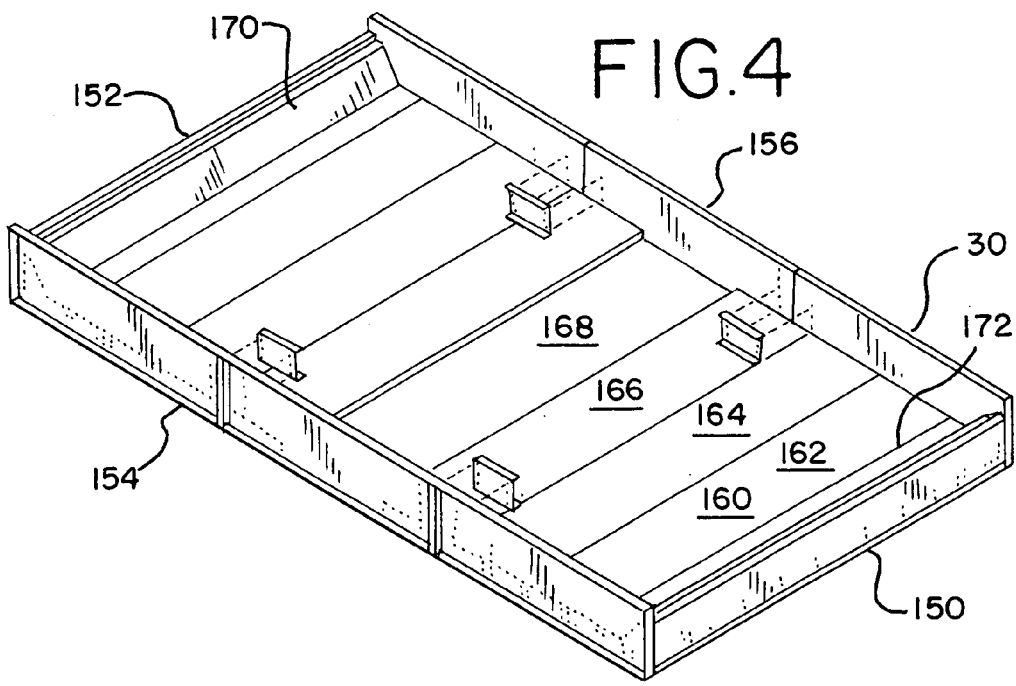

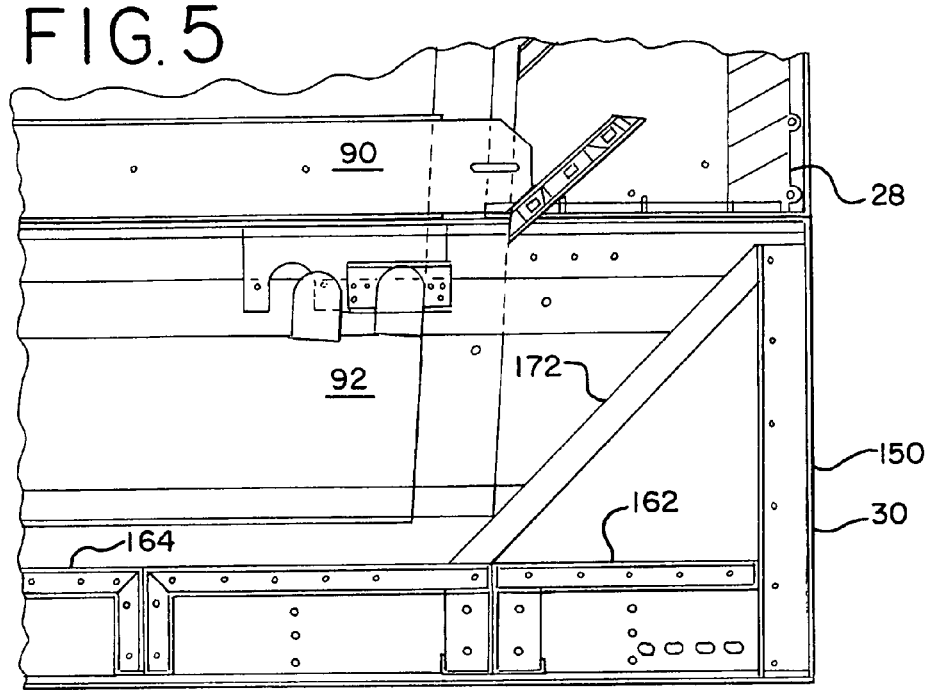
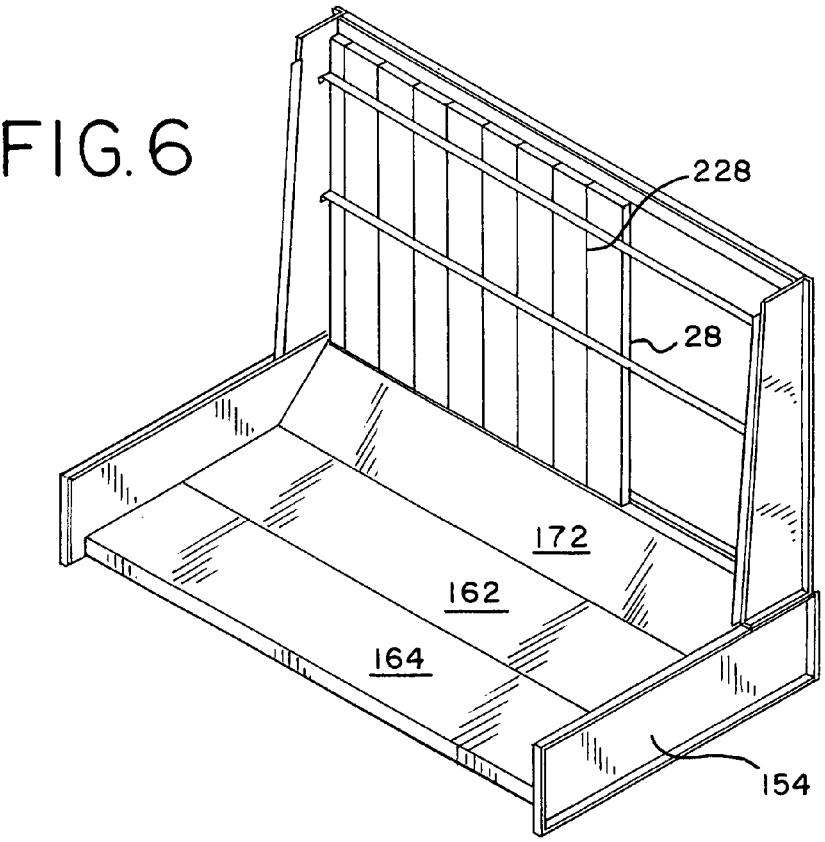

COOLING TOWER AIR INLET AND DRAIN PAN

BACKGROUND OF INVENTION

The present invention relates generally to cooling towers and, more specifically, to a cross flow evaporative heat and mass exchanger used for evaporative fluid cooling. The cross flow arrangement could be a single side or double side entry apparatus. Further, the cooling tower could comprise both a direct fluid cooling arrangement wherein air is passed over fill through which falling liquid is passed thereby cooling the liquid and an indirect cooling section wherein a fluid is passed through a coil and cooled by the liquid, usually water, falling downwardly across the coil thereby providing indirect cooling to a liquid or a gas passing through the coil.

In an induced draft single cross flow or double cross flow cooling tower, a fan is mounted on the roof outlet of the tower. This fan draws or induces air flow inwardly into the cooling tower through a sidewall or opposite sidewalls of the tower. Water or other evaporative liquid to be cooled is pumped to the top of the cooling tower structure and distributed through a series of spray nozzles. These spray nozzles emit a diffused spray of the water across the top of an appropriately selected fill medium. Such fill most typically comprised of a bundle of generally spaced parallel plastic sheets across each of which the water spray is dispersed and downwardly passed by gravity. A large surface area across which the water is dispersed on such sheets leads to good cooling by the induced air flow over such sheets. The cooled water is collected in a drain pan or sump and passed through to the desired cooling system wherein it will become heated and then pumped back to the cooling tower.

As mentioned above, the addition of an indirect cooling section in the form of a series of serpentine heat exchange conduits can be provided either above or below the fill sheets. A hot fluid or gas to be cooled or condensed enters the heat exchange conduits through an inlet header at one end of the conduits with the cool fluid exiting the conduit through a header joining the other ends of the conduit.

A concern in such cross flow cooling towers is the accumulation of algae or other biological contaminates in the drain pan. Such accumulation is usually due to incomplete flow of water through the drain pan. Such development of algae and other biological contaminates is increased with the exposure to sunlight. As the sump or drain pan must catch all flowing water from the cooling section, the design of such sump must address the both collection and drain needs to assure flow of all collected water from the sump to the drain outlet. Water treatment chemicals are used in the cooling tower sump to decrease the accumulation of such biological contaminates, but the design of the cooling tower sump and air inlet themselves can improve the resistance of the tower to forming such biological contaminates. Airborne debris that passes through the typical louver arrangement in the air inlet side or sides of the cross flow cooling tower can also contribute to the development of the biological contaminates. Accordingly, an improved design of the air inlet to eliminate of in flow of such airborne debris is also part of the present invention.

SUMMARY OF INVENTION

It is an object of the present invention to provide an improved cooling tower using a cross flow air flow relationship with an improved drain sump design.

It is also an object of the present invention to provide a cooling tower utilizing a cross flow air arrangement with an improved air inlet apparatus to decrease the potential for airborne debris to enter the tower.

In a mechanical draft cooling tower of the induced draft cross flow type using a single air entry side or two air entry sides with a single fan plenum chamber above the air inlet passages, the water spray downwardly onto the fill bundle spreads and trickles down the fill sheets. The water is cooled by the air flow across the fill sheet themselves.

In such cooling towers, in accordance with the present invention, it is also possible to provide an indirect cooling section wherein a tubular coil heat exchanger comprising a plurality of coil assemblies is provided above or below each fill bundle. The water falling from the direct and indirect cooling sections is collected in a drain sump. In order to assure the complete flow of such collected water through such sump, the ends of the sump are sloped to assure that such water is not collected in a stagnant area of the sump. It should be understood that each such sump is usually rectangular, having two ends and two generally longer sides. Steeply sloped internal wall ends aid in assuring the flow of water in the sump to avoid stagnation. Such steeply sloped sides do not detract from the entry of air through the inlets across the fill, but yet allow the water entering the drain pan to completely flow without collection in any possible stagnant area.

It is also part of the present invention to provide an improved design of louvers to the air inlet space of the cooling tower. Such improved louvers are generally of a honeycomb arrangement which lessen the potential for airborne particles or debris to enter the water falling across the cooling tower fill and enter the collection sump.

BRIEF DESCRIPTION OF DRAWINGS

In the drawings,

FIG. 3 is a perspective view of a cooling tower in accordance with an embodiment of the present invention having dual direct cooling sections;

FIG. 4 is a perspective view of the improved drain sump of an embodiment of the present invention;

FIG. 5 is a detailed sectional and partial cross section of the improved slope basin and the improved air inlet of an embodiment of the present invention, and FIG. 6 is a detailed partial view of an improved air inlet of an embodiment of the present invention.

DESCRIPTION OF THE PREFERRED EMBODIMENT

Figure 1:
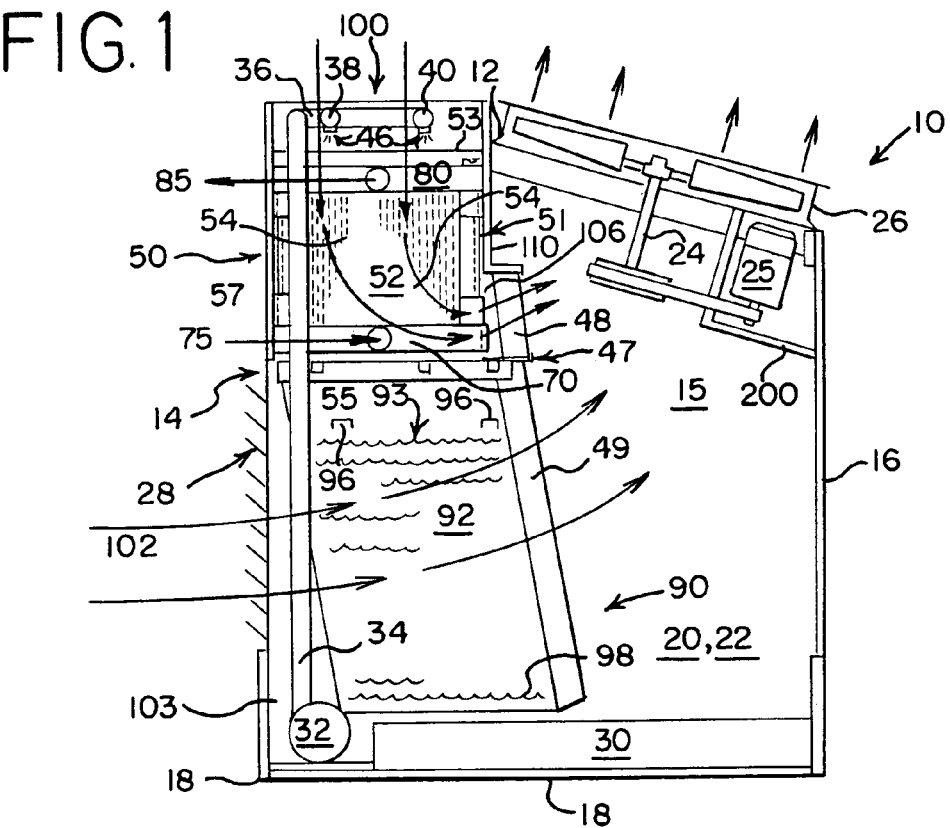
FIG. 1 is a side view of an embodiment of a cooing tower of the present invention having a single coil indirect evaporative heat exchange section and a direct heat exchange section.

Referring not to FIG. 1 of the drawings, the heat exchange apparatus 10 in accordance with the invention is shown as a closed-circuit cooling tower. Generally, apparatus 10 includes an enclosure structure which contains a multi-circuit indirect evaporative fluid cooling section 50, a direct evaporative heat exchange section 90, a lowermost evaporative liquid collection sump 30, and an uppermost distribution means 36 for spraying an evaporative liquid downwardly through apparatus 10, and a fan means 24 for moving a stream of air through each of the heat exchange sections 50 and 90, although natural draft is also a viable means for moving the air. Fan 24 can either be induced or forced draft centrifugal fan or a common propeller type fan, any of said fan choices requiring fan motor 25 to power them. Again referring to FIG. 1, motor 25 can be mounted within enclosure passageway 15 if an appropriate wet condition motor casing or a protective cover is used, or it can be mounted on the outside of the structure if desired. Here it is shown in the air stream in moisture proof box 200.

It is important to understand that apparatus 10 has many applications in the heat exchange field and that each application will use all of the same above-mentioned elements, although the operation of those elements might vary slightly from one type of application to the other. For example, apparatus 10 may be used to cool a single phase, sensible fluid such as water, which is flowing within an externally-supplied closed circuit system, or it may be sued to desuperheat and condense a multi-phase, sensible and latent fluid such as a refrigerant gas, also supplied from an external closed-circuit system.

In accordance with one embodiment of the present invention illustrated in FIG. 1, the enclosure structure comprising apparatus 10 is shown with a generally rectangular shape which includes an upper roof surface 12, a base 18, a front wall 14, a rear wall 16, a first side wall 20 and a second side wall 22. The side walls 20, 22 and rear wall 16 are continuously solid panel members made from materials such a sheet metal, fiberglass, plastic, or the like, and these walls have corrosion resistant properties as does front wall 14 and roof surface 12.

The rectangular enclosure structure of FIG. 1 contains an indirect heat exchange section 50, which is comprised of a single coil assembly 52, superposed above the direct evaporative heat exchange section 90. The indirect heat exchange section 50 is typically of a rectangular shape, having an inboard side 51, an outboard side 57, a top side 53 and a bottom side 55. The indirect heat exchange section coil assembly 52 receives a flowing hot fluid to be cooled from an offsite process, and it is cooled in this section by a combination of indirect sensible heat exchange and a direct evaporative heat exchange. The evaporative liquid, which is usually cooling water, is sprayed downwardly by distribution means 36 onto the indirect section, thereby exchanging indirect sensible heat with the fluid to be cooled, while the stream of ambient air entering primary air inlet 100, evaporatively cools the water as the two mediums move downwardly through coil system 52. In this particular embodiment the entering air stream is shown entering and flowing in a direction which is parallel or concurrent with the direction of cooling water, although the air flow stream is not limited to any particular flow pattern, as will become evident later on where a crosscurrent air flow pattern will be explained. Once the air and water cooling mediums reach bottom side 55 of indirect section 50, they split, with the air system being pulled into plenum 105 and then into passageway 15 by fan 24, while the water gravitationally descends into direct heat exchange section 90. The air is then discharged from apparatus 10 through the fan cylinder 26 while the water is cooled in the direct heat exchange section as will be explained shortly. It is also important to note that the air stream entering inlet 100 supplies air that will only be used for cooling purposes in the indirect heat exchange section, regardless of the actual air flow pattern through said section.

The direct evaporative heat exchange section 90 functions to cool the water that is heated and descending from the indirect heat exchange section 50. Direct evaporative heat exchange 90 is comprised of an array of tightly-spaced, parallel, plastic sheets 93 which form fill bundle 92. The hot water received by fill bundle 92 from indirect section 50 is distributed across each fill sheet 93 so that a source of outside ambient air which enters secondary air inlet 102, evaporatively cools the hot water descending the sheets. Here, the ambient air stream is shown entering direct section 90 in a crosscurrent fashion to the descending hot water draining through the fill bundle 92, although other air flow schemes can be used, as will be seen later. The plastic fill sheets 93 are usually hung from beams 96 that are connected to and traverse sidewalls 20 and 22. Each sheet 93 has a generally continuous, waved pattern of grooves running the entire length of the sheet to aid in spreading the downflowing hot water into a thin film, thereby providing a larger exposed surface area for the air stream to interact with and evaporatively cool. Fill sheets 93 are preferably made from a polyvinyl chloride material, although other types of plastics could be used. Secondary ambient air inlet 102 provides ambient air that is strictly dedicated for evaporative cooling purposes in the direct heat exchange section only.

As further seen from FIG. 1 a secondary entryway 102 is covered with a honeycombed structure 28. Such honeycombed structure 28 is an improvement over the typical louver arrangement. Such honeycomb structure includes openings that readily allow air flow but keep air borne debris from entering indirect cooling tower 90 and fill bundle 92. This honeycomb design is further described in FIGS. 5 and 6 below. The ambient air entering through honeycomb 28 initially flows across the secondary air plenum 103 before entering fill bundle 92 in a crosswise or crosscurrent fashion to the hot water downwardly gravitating through the plastic fill sheets 93. As mentioned, the stream of cold air passing over the film of hot water evaporatively removes heat from the water, thereby cooling the hot water by well known evaporative effects. The heated air existing evaporative cooling section 90 then passes through secondary drift eliminator 49 before entering passageway 15, where it is forced by fan 24 to upwardly change directions for discharge to the atmosphere through fan cylinder 26. Since the air leaving the direct water evaporative cooling section 90 becomes saturated with moisture absorbed from the cooling water, the secondary drift eliminator 49 is interposed between the fill bundle 92 and passageway 15 to facilitate in removing the water droplets entrapped in the air stream. Drift eliminator 49 it typically comprised of closely spaced metal, plastic or wood slats or louvers which permit air flow thererthrough, but will collect the fine water droplets in the air. The collected water then gravitates down eliminator 49, directly into underlying collection sump 30 for recirculation.

As seen in FIG. 1, the entire base 18 of apparatus 10 is substantially comprised of a water collection sump 30 which is typically disposed only below direct evaporative heat exchange section 90, although it truly depends upon how the components are arranged within the structure of apparatus 10, where the direct and indirect sections are side-by-side. The side-by-side or indirect-over-direct arrangements merely emphasize that the most important feature of the present invention is that the heated cooling water descending from the direct evaporative heat exchange section 90 is allowed to mix in sump 30 so that it can attain a uniform temperature before being pumped for use again in the indirect heat exchanger section 50. As seen, vertically extending recycle piping 34 operably connects cooling water distribution means 36 with pump 32 and sump 30. Pump 32 is arranged outside of sump 30 near the corner of front wall 14 so that it can be easily serviced.

Distribution means 36 is generally located above the single coil assembly 52 of indirect evaporative cooling section 50, which is also in positional relationship with primary ambient air inlet 100. Distribution means 36 consists of identical cooling water distribution legs 38 and 40, each of which laterally transverse the width of tower 10 in a spaced, parallel relationship from each other and from front wall 14. Each distribution leg 38 and 40 is constructed from pipe and has a series of equidistantly spaced spray nozzles 46 attached along the bottom of the pipe for evenly distributing the cooling water across the top side 53 of indirect evaporative heat exchange section 50 and generally across the primary air inlet 100. Depending upon the heat exchange capacity required from apparatus 10, the number of water distribution legs can vary from 1 to 5 legs per indirect evaporative coil section 52, with the length of each leg varying between 3-24 feet. Typically, the number of nozzles 46 per coil assembly 52 of indirect section 50 will vary between 9-180 nozzles, also depending upon the tower capacity. Likewise, pump 32 is sized according to tower capacity such that the continuous supply of cooling water pumped to spray nozzles 46 will produce a fine spray of water across the entire span of the primary air inlet 100 and hence, across the single coil assembly 52. Similarly, an upper drift eliminator 48 is interposed between side outlet opening 106, plenum 105 and passageway 15 to remove the water droplets entrapped by the primary air stream while evaporatively cooling the water descending through indirect heat exchange section 50. Pan 47 is disposed below upper drift eliminator 48 for collecting the water from mist eliminator 48 and gravitationally dispensing it upon fill sheet bundle 92. It is to be understood that the opening which defines primary ambient air inlet 100 has a dimensional length and width equal to that of the indirect evaporative cooling section 50 no matter where the entry is located. From FIG. 1 it is seen that the entering air stream initially approaches entryway 100 generally perpendicular to the top side 53 of indirect heat exchange section 50, substantially concurrent with the water sprayed downwardly from distribution means 36.

Figure 2:
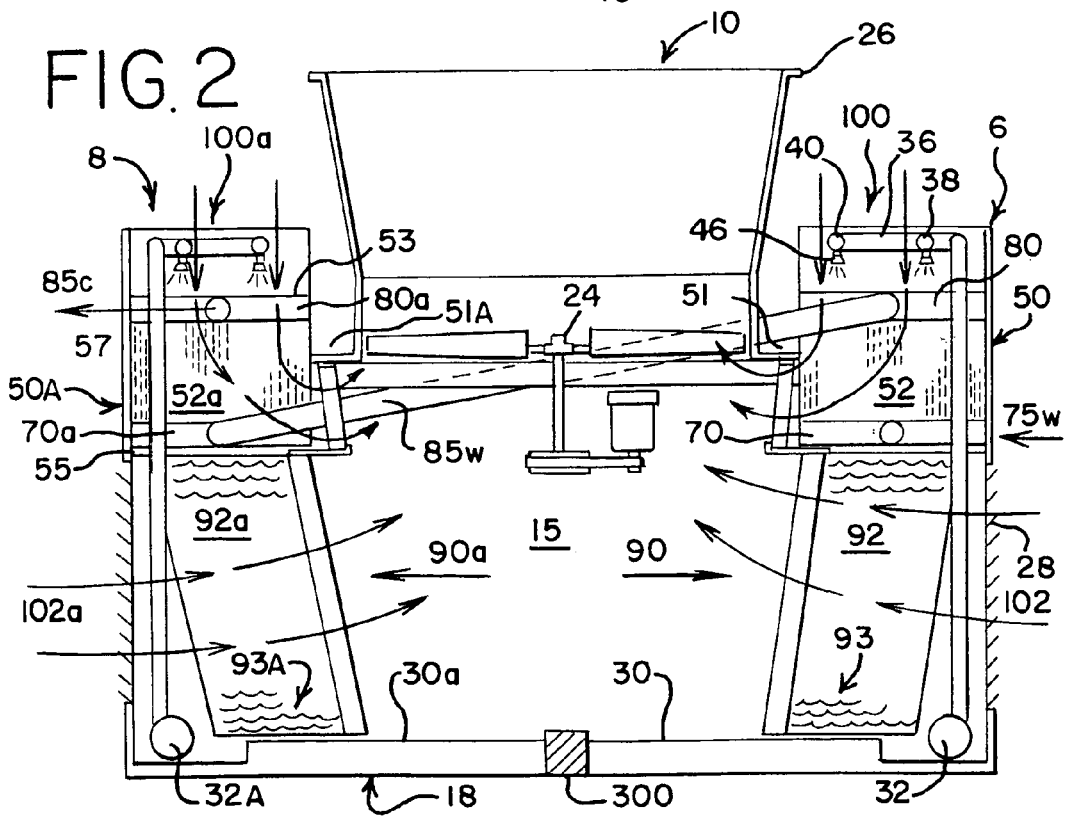
FIG. 2 is a side view of a second embodiment of the present invention having a dual air inlet cooling tower with two indirect and direct sections.

Referring now to FIG. 2 of the drawings, a series flow, dual coiled assembly 52 and 52A is incorporated into apparatus 10 with a split cooling water system. This apparatus is generally known in the art as a closed loop, double coiled cooling tower and represents the preferred dual coiled embodiment. Each of the tower ends 6 and 8 contain the exact same elements within each respective tower half as are contained within the structure of the single coiled, preferred embodiment of FIG. 1. As seen, the hot fluid to be cooled is initially supplied to the first tower end 6 through supply piping 75W. the hot fluid generally enters and travels upwardly as previously explained for the single coiled apparatus, however, instead of exiting indirect heat exchange section 50 and returning to the offsite process, the fluid leaves indirect section 50 through piping 85W and is communicated to the inlet header 75a on the second indirect coil assembly 52a of the second indirect heat exchange section 50A of tower half 8. Once again, the fluid travels upwardly through indirect heat exchange section piping 52a and cooling capacity is further increased by an additional 10% as compared to the same unit with the heat exchange sections piped in parallel. Once cooled within indirect heat exchange section piping 52a, the fluid is then returned to the offsite process through discharge piping 85C. All methods of heat exchange within each of the heat exchange sections on each tower half 6 and 8 are exactly the same as those previously described with the single coil operation, except that the cooling water systems for each tower half 6, 8 operate separately, with each tower half 6, 8 having its own sump, 30 and 30A, and its own cooling water distribution system.

Referring now to FIG. 3 of the drawings, an embodiment of the present invention is shown in a perspective view. This perspective view is similarly numbered features of FIG. 2 are set forth in FIG. 3, and will not be described in detail here. Indirect heat exchange section is shown generally at 50, although it should be understood that the features of the present invention could apply to a cooling tower that does not include an indirect heat exchange section. A direct heat exchange section 90 is seen to include fill sheet bundle 92 which is visible with part of honeycomb inlet 28 broken away to show portion of fill sheet 92. Further, collection basin is shown generally at 30 which will be described further. Collection basin 30 is seen to be generally rectangular in shape, having ends 150 and 152, with sides 154 and 156.

Referring now to FIG. 4, basin or sump 30 is shown in detail as a generally rectangular structure having ends 150 and 152 with sides 154 and 156 forming a generally rectangular, pan like structure. Most typically, sump 30 is comprised of galvanized steel, but can be comprised of aluminum or stainless steel. Bottom 160 is seen to be comprised of a series of sections 162, 164, and 166 which are seen to be inclined downwardly toward center 168 on one side of sump 30. Similar sections are on the other side of sump 30. A drain exits from center sump section 168.

In order to decrease the possibility of biological contaminates such as algae building up in sump 30 while it holds water drain from direct cooling tower section 90, inclined internal end walls 170 and 172 are provided on the internal surface of sump 30. Such inclined internal end walls 170 and 172 extend the entire width of sump 30 in this embodiment, and the presence of such inclined end walls acts to ensure the movement of all water that enters sump 30 toward lower most center sump sections 168 to assure the elimination of any possibility of stagnation of such water in sump 30. This greatly reduces the possibility of formation biological contamination such as algae in the water held in sump 33.

Referring now to FIG. 5 of the drawings, a detailed end view, in partial cross section, is shown of sump 30. Sump 30 is seen to be comprised of an end wall 150, with internal inclined wall 172 forming part of the actual collection section of sump 30. It is seen that fill 92 may extend downwardly into sump 30. Further, the slight incline of bottom section 162 is seen to be extended to adjacent bottom sump section 164 to assure a downwardly flow and collection of waters entering sump 30 toward center lower most sump section 168. Further, it is seen that the angled incline of internal sump end section 172 greatly reduces the possibility of any stagnation or collection of water within sump 30 that would not be moved toward center lower most section 168 and outwardly through the drain in sump 30. The preferred angle of internal sump end wall 172 is about 35°, with angles from 25 to 60° being functional as well.

Also shown in FIGS. 5 and 6 is a view of honeycomb end wall inlet 28. It is seen that such structure, which is generally of fiberglass, provides a ready inlet of air into indirect cooling section 90 and fill 92. Such honeycomb structure 28 is seen to greatly reduce the potential for airborne debris to enter direct cooling section 90. Honeycomb structure 28 is comprised of a plurality of vertically aligned slats 228 that have openings therein to allow the passage of air therethrough yet block the passage of airborne debris.

What is claimed is:

1. A mechanical draft direct and indirect cooling tower comprising
   at least one direct section having a plurality of fill sheets wherein a fluid is distributed over the fill sheets,
   a fan to draw air into the cooling tower across the fill sheets thus cooling the fluid flowing over the fill sheets,
   the fluid distributed over the fill sheets falling from the fill sheets into a collection sump,
   the collection sump having a generally rectangular configuration with two parallel end walls and two parallel side walls, a sloped floor with at least two different slopes, and a drain, wherein the sloped floor has a compound slope at least one end wall and is in contact with the side walls such that a significant portion of the compound sloped floor includes a first part located above an operating sump water level and wherein the sloped floor in the first part is sloped to prevent the settling of dirt and debris,
   further comprising a second part of the compound slope floor sloped towards a drain but at a lesser angle from the horizontal than the first part of the compound slope floor.

2. The cooling tower of claim 1 wherein the first part of the sloped floor is sloped 25 to 70° from the horizontal.

3. The cooling tower of claim 1 wherein the first part of the sloped floor is sloped 40 to 60° from the horizontal.

4. The cooling tower of claim 1 wherein at the operating sump water level, less than three inches of horizontal water surface prior to the air entrance to the fill section is located above the surface of the first part of the compound slope floor.

5. The cooling tower of claim 1 wherein a louver arrangement is provided through which air is drawn into the cooling tower, the louver arrangement comprising aligned slats that block the passage of airborne debris and sunlight into the cooling tower.

6. A mechanical draft cooling tower comprising
   at least one direct cooling section having a plurality of fill sheets wherein a fluid is distributed to flow over the fill sheets,
   a fan to draw air through an air inlet into the cooling tower across the fill sheets thus cooling the fluid flowing over the fill sheets,
   the fluid distributed over the fill sheets falling from the fill sheets into a collection sump,
   the collection sump having a generally rectangular configuration with two parallel end walls and two parallel side walls, a sloped floor with a least two different slopes, and a drain, wherein the sloped floor has a compound slope at least one end wall and is in contact with the side walls such that a significant portion of the compound sloped floor includes a first part in front of the air inlet located above an operating sump water level and wherein the sloped floor in the first part of the compound sloped floor is sloped to prevent the settling of dirt and debris, further comprising a second part of the compound slope floor sloped towards a drain but at a lesser angle from the horizontal than the first part of the compound slope floor.

7. The cooling tower of claim 6 wherein the first part of the compound sloped floor is sloped 25 to 70° from the horizontal.

8. The cooling tower of claim 6 wherein the first part of the sloped floor is sloped 40 to 60° from the horizontal.

9. The cooling tower of claim 6 wherein at the operating sump water level, less than three inches of horizontal water surface prior to the air entrance to the fill section is located above the surface of the first part of the compound slope floor.

10. The cooling tower of claim 6 wherein a louver arrangement is provided through which air is drawn into the cooling tower, the louver arrangement comprising aligned slats that block the passage of airborne debris and sunlight into the cooling tower.

* * * * *